US006733739B2

(12) United States Patent
Vecht et al.

(10) Patent No.: US 6,733,739 B2
(45) Date of Patent: May 11, 2004

(54) PREPARATION OF SULPHIDES

(76) Inventors: Aron Vecht, 95 Corningham Rd., London NW 11 7DL (GB); Dominic Andrew Davies, 195 The Avenue, West Wickham, Kent BR4 OEG (GB)

( * ) Notice: Subject to any disclaimer, the term of this patent is extended or adjusted under 35 U.S.C. 154(b) by 29 days.

(21) Appl. No.: 10/132,166

(22) Filed: Apr. 26, 2002

(65) Prior Publication Data
US 2003/0202931 A1 Oct. 30, 2003

Related U.S. Application Data

(63) Continuation of application No. PCT/GB00/03910, filed on Oct. 12, 2000.

(30) Foreign Application Priority Data

Oct. 28, 1999 (GB) .............................................. 9925382
May 13, 2000 (GB) .............................................. 0011442

(51) Int. Cl.[7] .......................... C01G 1/12; C01G 9/08; C01G 11/02; C01G 13/00
(52) U.S. Cl. ................. 423/561.1; 423/566.1
(58) Field of Search ........................... 423/561.1, 566.1

(56) References Cited

U.S. PATENT DOCUMENTS 3,421,850 A  * 1/1969 Peterson et al. ......... 423/566.1
3,770,630 A    11/1973 Kamperman ................ 210/50
4,127,639 A  * 11/1978 Piret et al. ..................... 423/42
4,746,541 A    5/1988  Marikar et al. ........... 427/126.1
5,032,316 A    7/1991  Takahashi et al. ..... 252/301.605
5,178,842 A    1/1993  Fugleberg ..................... 423/37

OTHER PUBLICATIONS

Database WPI, Section Ch, week 198605, Derwent Publications Ltd., London, GB, AN 1986–032567 XP002158588 For JP 60–254515 A (Asahi Ind Co Ltd), Dec. 16, 1985, abstract.
Database WPI, Section Ch, Week 198233 Derwent Publications Ltd., London GB; AN 1982–69477E, XP002158589 & JP 57–112478 A (Asahi Chem Ind Co. Ltd), Jul. 13, 1982, abstract.

* cited by examiner

*Primary Examiner*—Wayne A. Langel
(74) *Attorney, Agent, or Firm*—Pillsbury Winthrop LLP

(57) ABSTRACT

Sulphides are prepared by combining a dithionite compound with an aqueous alkaline solution of an appropriate cation or mixture of cations. On heating the corresponding sulphides are precipitated. The dithionite compound may be a dithionite dianion which is produced as an intermediary when thiourea dioxide is used as a starting material in the solution. Examples of appropriate cations are zinc (as zinc acetate) and copper (as copper acetate). The precipitate is dried and subsequently fired to produce high quality sulphides which may be used as phosphors or other optoelectronic materials.

8 Claims, 1 Drawing Sheet

PREPARATION OF SULPHIDES

CROSS-REFERENCE TO RELATED APPLICATIONS

Figure 1:
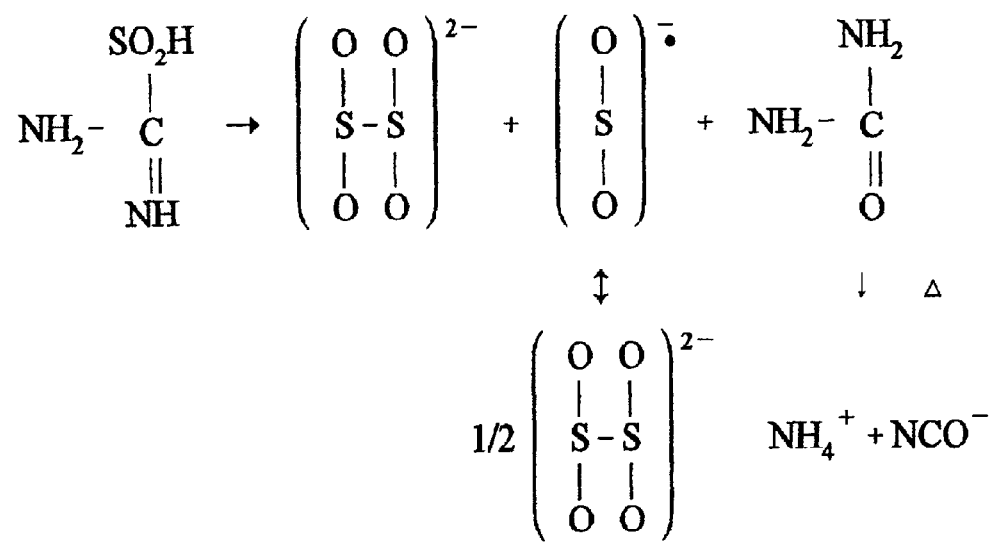

This is a continuation of PCT/GB00/03910, filed Oct. 12, 2000, which claims priority to GB 9925382.5, filed Oct. 18, 1999 and GB 0011442.1, filed May 13, 2000. All applications are hereby incorporated by reference herein in their entirety.

TECHNICAL FIELD

This invention relates to the preparation of sulphides. The invention has application in the synthesis of phosphors, pigments, ceramics and optoelectronic materials. The phosphors may be used for photoluminescence, high and low voltage cathodoluminescence, and AC or DC electroluminescence. The phosphors can also be used in x-ray applications and for thermoluminescent storage.

BACKGROUND ART

Known methods of preparing sulphides include:
i) the reaction between gaseous hydrogen sulphide and a solution containing the appropriate cation, and
ii) the thermal and/or catalytic decomposition of an organo-sulphur compound in a solution containing the desired cation.

Typical of the reagents employed in the second method are thiourea and thioacetamide. This method employs controlled release of the anionic species uniformly throughout the reaction container and is commonly known as homogeneous precipitation.

Both methods have some disadvantageous features. In the first method the use of highly toxic gaseous reagents can be extremely hazardous. In addition, it is believed that this method leads to the precipitation of non-stoichiometric materials having an irregular, plate-like morphology. As to the second method, the principal disadvantage of most organo-sulphur compounds is their high cost. A further disadvantage is that the precipitated product is usually contaminated with the organic starting compound.

Recently there has been published in International Patent Publication No. WO 98/55395 a method of preparing sulphides which comprises the steps of dissolving sulphur in hydrogen hydrate and then combining the resulting solution with a solution of an appropriate cation to precipitate the corresponding sulphide.

It is an object of the invention to provide an alternative method of preparing sulphides which does not generate toxic fumes.

DISCLOSURE OF THE INVENTION

Accordingly the present invention in one aspect comprises a method of preparing sulphides in which a dithionite compound is combined with an aqueous solution of an appropriate cation to precipitate the corresponding sulphide.

The dithionite compound may be a metal or other cationic dithionite compound. Preferably the combination of the dithionite compound with an appropriate cation takes place in an aqueous solution which is alkaline.

In carrying out the invention the dithionite compound may be produced as an intermediary in the aqueous thermal decomposition of formamidinesulfinic acid. This substance, which is also known as thiourea dioxide, has the chemical formula $H_2NC(NH)SO_2H$.

Thiourea dioxide may therefore be used as the starting material and according to the invention in another aspect a method of preparing sulphides comprises combining thiourea dioxide with a solution of an appropriate cation to precipitate the corresponding sulphide. In this method a dithionite dianion is produced as an intermediary during the reaction of thiourea dioxide with the cation.

Preferably the precipitate is subsequently fired. The solution may comprise a mixture of appropriate cations. Examples of appropriate cations are zinc and copper.

Figure 2:
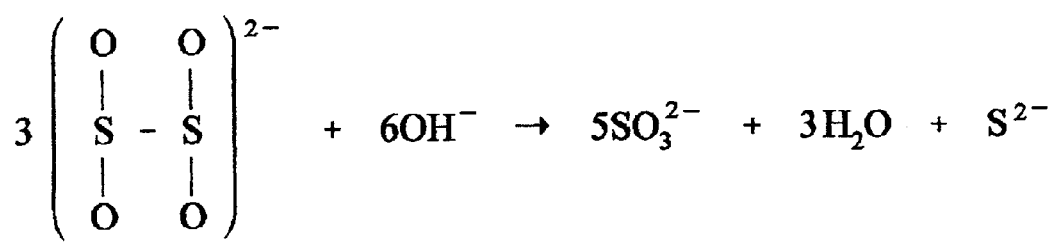

In order that the invention may be more fully understood reference will now be made to the accompanying drawing in which:

FIG. 1 illustrates the aqueous thermal decomposition of formamidinesulfinic acid and the formation of dithionite dianion, and FIG. 2 illustrates the decomposition of a dithionite in aqueous alkaline solution to form a sulphide.

Both FIG. 1 and FIG. 2 comprise chemical equations in standard notation which is well understood.

Examples of carrying out this invention will now be described.

EXAMPLE 1

Zinc sulphide is first prepared by the aqueous alkaline decomposition of a dithionite in the presence of zinc ions. 40 g of zinc acetate and 120 g of sodium dithionite were dissolved in 2 liters of water in a 3 liter sized beaker. Ammonia solution was added until the reaction mixture had a pH value of 8. The reaction mixture was then heated to 90° C. for 2.5 hours while stirring. On cooling the resulting white precipitate was filtered off under vacuum, then washed with 2 liters of water and 500 ml of iso-propyl alcohol and dried overnight. The resulting material was pure zinc sulphide.

To produce a phosphor 20 g of the zinc sulphide was then intimately ground with 0.01 mol % of copper chloride and with sodium chloride of a quantity which was 10% by weight of the zinc sulphide. The ground mixture was packed tightly into a silica crucible. The packed material was then covered in finely ground sulphur and the crucible was covered with a silica lid. The crucible was then fired in air at 900° C. for one hour. After cooling the packed material was removed from the crucible, washed in a hot 1:1 solution of glacial acetic acid and water, then again in hot water and finally dried. The resulting white powder emitted green light when irradiated with UV light of a wavelength of 366 nm.

In the following examples of carrying out the invention thiourea dioxide is used as the starting material.

EXAMPLE 2

27.4 g (0.125 mol) of zinc acetate together with 2.4 mg of copper acetate (0.01 mol percent of copper) and 137 g of thiourea dioxide was dissolved in 3l of deionised water. The solution was heated using a hot plate to 70° C. while stirring and then held at that temperature for one hour. During that time a reaction took place and a precipitate was produced. The solution was then allowed to settle and cool for 30 min and the precipitate was then filtered off under vacuum using a Whatmans No. 2 filter paper. The filtered precipitate was washed with 2l of deionised water and 500 ml of isopropanol and then dried in an oven at 80° C. overnight.

The dried precipitate was fired utilising two crucibles, the outer one containing a sacrificial charge of zinc sulphide and the inner one containing the unfired phosphor. 2% by weight of sodium chloride and 3% by weight of sulphur were added to the material before firing. Firing was carried out at 900°

C. for one hour. On cooling the phosphor was washed with 600 ml of boiling glacial acetic acid in an equal amount of water, and then again twice with 600 ml of water and finally dried.

EXAMPLE 3

27.4 g (0.125 mol) of zinc acetate together with 1.93 mg of silver nitrate (0.01 mol percent of silver) and 137 g of thiourea dioxide was dissolved in 3 l of deionised water. The solution was heated using a hot plate to 70° C. while stirring and then held at that temperature for one hour. During that time a reaction took place and a precipitate was produced. The solution was then allowed to settle and cool for 30 min and the precipitate was then filtered off under vacuum using a Whatmans No. 2 filter paper. The filtered precipitate was washed with 2 l of deionised water and 500 ml of isopropanol and then dried in an oven at 80° C. overnight.

Firing of the dried precipitate was then carried out in a lidded crucible in air at 400° C. for 30 min. The fired material was then lightly ground in a pestle and mortar with 2% by weight of sodium chloride. The mixture was then fired in a lidded crucible in air at 900° C. for one hour. On cooling the phosphor was washed with 600 ml of boiling glacial acetic acid in an equal amount of water, and then again twice with 600 ml of water and finally dried.

What is claimed is:

1. A method of preparing sulphides in which a dithionite compound is combined with an aqueous solution of an appropriate cation to precipitate the corresponding sulphide and the precipitate is subsequently fired.

2. The method as claimed in claim 1 in which the dithionite compound is a cationic dithionite compound.

3. The method as claimed in claim 1 in which the dithionite compound is a metal dithionite compound.

4. The method as claimed in claim 1 in which a mixture of appropriate cations is used.

5. The method as claimed in claim 1 in which the aqueous solution is an alkaline solution.

6. A method of preparing sulphides comprising combining thiourea dioxide with a solution of an appropriate cation to precipitate the corresponding sulphide.

7. The method as claimed in claim 6 in which a mixture of appropriate cations is used.

8. The method as claimed in claim 6 or claim 7 in which the precipitate is subsequently fired.

* * * * *